US012485723B2

(12) United States Patent
Li et al.

(10) Patent No.: US 12,485,723 B2
(45) Date of Patent: Dec. 2, 2025

(54) FOLDABLE AND FLEXIBLE VENT FOR AIR CONDITIONER

(71) Applicant: SAIC GM Wuling Automobile CO., Ltd, Liuzhou (CN)

(72) Inventors: Wei Li, Liuzhou (CN); Changye Liu, Liuzhou (CN); Qiang Hu, Liuzhou (CN); Xiaobin Zhao, Liuzhou (CN); Long Tang, Liuzhou (CN); Qiuni Ling, Liuzhou (CN)

(73) Assignee: SAIC GM Wuling Automobile CO., Ltd, Liuzhou (CN)

( * ) Notice: Subject to any disclaimer, the term of this patent is extended or adjusted under 35 U.S.C. 154(b) by 382 days.

(21) Appl. No.: 18/190,768

(22) Filed: Mar. 27, 2023

(65) Prior Publication Data

US 2023/0339287 A1    Oct. 26, 2023

(30) Foreign Application Priority Data

Apr. 24, 2022 (CN) .......................... 202210459719.6

(51) Int. Cl.
*B60H 1/00* (2006.01)
(52) U.S. Cl.
CPC ....... *B60H 1/00685* (2013.01); *B60H 1/0065* (2013.01); *B60H 2001/00721* (2013.01)
(58) Field of Classification Search
CPC ................ B60H 1/0065; B60H 1/0685; B60H 2001/00721; B60H 1/3414; B64D 2013/003

USPC .......................................................... 454/155
See application file for complete search history.

(56) References Cited

U.S. PATENT DOCUMENTS

| 2011/0111685 | A1* | 5/2011 | Benamira ............ | B60H 1/3457 454/155 |
| 2013/0059520 | A1* | 3/2013 | Wolf .................... | B60H 1/3457 454/154 |
| 2019/0009650 | A1* | 1/2019 | Yueksel ............... | B60H 1/3414 |
| 2022/0063380 | A1* | 3/2022 | Watanabe ............ | B60H 1/3421 |

FOREIGN PATENT DOCUMENTS

| CN | 208042458 U | 11/2018 |
| CN | 211695326 U | 10/2020 |
| CN | 111959232 A | 11/2020 |

* cited by examiner

*Primary Examiner* — Ko-Wei Lin
(74) *Attorney, Agent, or Firm* — Nitin Kaushik

(57) ABSTRACT

The present invention relates to the technical field of automobile fittings, and discloses a foldable and flexible vent for an air conditioner, comprising a base, a hose and an air guide cylinder, wherein one end of the base communicates with the vent for the air conditioner, and the other end communicates with the hose; the air guide cylinder is arranged at one end of the hose away from the base; the vent further comprises an air damper and a rotating mechanism. The plurality of air dampers are distributed in a circular array in the air guide cylinder with the axis thereof as the center, and then adjusted by the synchronous angle of the rotating mechanism, so that the wind direction of the hose flowing into the air guide cylinder is uniformly discharged in a spiral manner, achieving the effect of simple, convenient and efficient uniform venting.

10 Claims, 7 Drawing Sheets

FOLDABLE AND FLEXIBLE VENT FOR AIR CONDITIONER

CROSS-REFERENCE TO RELATED APPLICATIONS

The application claims priority to Chinese patent application No. 2022104597196, filed on Apr. 24, 2022, the entire contents of which are incorporated herein by reference.

TECHNICAL FIELD

The present invention relates to the technical field of automobile fittings, and particularly to a foldable and flexible vent for an air conditioner.

BACKGROUND

The vent of an automobile air conditioner is an important functional component of an automobile instrument panel system, and the main function thereof is to guide the wind generated by the air conditioner to passengers so as to meet the blowing requirements of the passengers. The vent for the automobile air conditioner is generally composed of an upper-layer blade, a lower-layer blade, a throttle, a toggle button and a connecting rod, and is fixed on the instrument panel. The toggle button is arranged on the upper-layer blade. The lower-layer blade is connected to the toggle button via the connecting rod. When the toggle button mechanism is toggled, the lower-layer blade moves under the action of the link mechanism so as to adjust the wind direction.

The existing methods of adjusting the wind direction at the vent for the air conditioner are all achieved by adjusting the blades. However, due to the limitation of the shape of some existing models, the blades at the vent for the air conditioner generally adopt a parallel adjustment design, resulting in the difference in the gap size and angle between each blade to cause uneven venting and affecting the user's experience. Therefore, a foldable and flexible vent for the air conditioner is proposed to solve the above-mentioned problems.

SUMMARY

(I) Technical Problem Solved

In view of the deficiencies of the prior art, the present invention provides a foldable and flexible vent for an air conditioner, which has the advantages of spiral uniform and equal-angle venting, etc. and solves the problem that the existing methods of adjusting the wind direction of the air-conditioning vent are all achieved by adjusting the blades; however, due to the limitation of the shape of some existing vehicle models, the blades at the vent for the air conditioner generally adopt a parallel adjustment design, resulting in the difference in the gap size and angle between each blade to cause uneven venting and affecting the user's experience.

(II) Technical Solution

In order to achieve the purpose of the above-mentioned spiral uniform and equiangular venting, the present invention provides the following technical solutions. A foldable flexible vent for an air conditioner comprises a base, a hose and an air guide cylinder, wherein one end of the base communicates with the vent for the air conditioner, and the other end communicates with the hose; the air guide cylinder is arranged at one end of the hose away from the base; the vent further comprises an air damper and a rotating mechanism;

the air damper is arranged in the air guide cylinder and is rotatable in a radial direction of the air guide cylinder; the number of air dampers is not less than three; a plurality of air dampers are distributed in a circular array with the axis of the air guide cylinder as a center line, and are used for adjusting a wind direction angle and a wind volume of the air guide cylinder; and the rotating mechanism is arranged to rotate coaxially with the air guide cylinder and slidably abut against the air dampers, and is used for synchronously and equiangularly adjusting the rotation of the plurality of air dampers.

Preferably, the damper comprises an air guide plate and a linkage assembly; the air guide plate is rotatably arranged in the air guide cylinder along the air guide cylinder in the radial direction and forms an air flow channel with the air guide cylinder; the linkage assembly is arranged on the air guide plate and slidably abuts against the rotating mechanism, and is used for driving the air guide plate to rotate in cooperation with the rotating mechanism.

Preferably, the linkage assembly comprises a first baffle and a second baffle; the first baffle is arranged on a side of the air guide plate away from the base and slidingly abuts against the rotating mechanism; the second baffle is spaced apart from the first baffle and arranged on the air guide plate; and a guide groove slidably abutting against the rotating mechanism is formed between the first baffle and the second baffle.

Preferably, the center line of the guide groove is in a same plane as and perpendicular to a rotation axis of the air guide plate.

Preferably, the rotating mechanism comprises a rotary disc, a rotary knob and a driving assembly; the rotary disc is arranged to rotate coaxially with the air guide cylinder; the rotary knob is arranged on a side of the rotary disc away from the base; the driving assembly is arranged on the rotary disc and extends into the guide groove for driving the first baffle and the second baffle to rotate the air guide plate.

Preferably, the driving assembly comprises a vertical plate and screws; the vertical plate is arranged on the rotary disc; the screws are arranged on the vertical plate in the radial direction of the air guide cylinder and slide against both the first baffle and the second baffle; the number of the screws is equal to the number of the air guide plates; and the screws are distributed in a circular row with the axis of the air guide cylinder as the center line.

Preferably, when the air guide plate rotates to a maximum angle $\beta$, the air guide plate abuts against the rotary disc; when the plane of the air guide plate is perpendicular to the axis of the air guide cylinder, a minimum distance between the screw and the axis of rotation of the air guide plate is D; and the minimum distance between the first baffle and the second baffle and the air guide plate is not less than $D/\cos\beta$.

Preferably, the invention further comprises a telescopic mechanism, wherein one end of the telescopic mechanism is fixedly connected to the base, and the other end thereof is movably connected to the rotary knob for adjusting a distance and an angle between the rotary knob and the base.

Preferably, the telescopic mechanism comprises a positioning cylinder, a first sleeve, a spring and a rotating assembly; the positioning cylinder is arranged on the base;

the first sleeve is sleeved with an outer wall of the positioning cylinder; the first sleeve is provided with a through hole; the positioning cylinder is provided with a clamping block extending into the through hole; the inner wall of the first sleeve is provided with a positioning groove; the positioning cylinder is provided with a positioning block extending into the positioning groove; one end of the spring is arranged on the positioning cylinder, and the other end is arranged on the rotating assembly; the rotating assembly is arranged on the first sleeve and is movably connected to the rotary knob.

Preferably, the clamping block comprises an elastic portion, an abutting surface and a guide surface; the elastic portion is arranged on the positioning cylinder; the abutting surface perpendicular to the axis of the positioning cylinder is arranged on the elastic portion, and the abutting surface is used for axially limiting the first sleeve and the positioning cylinder; one end of the elastic portion away from the base is provided with the guide surface that is transitional; the rotating assembly comprises a ball arm and a limit cylinder; the ball arm is arranged at one end of the first sleeve away from the base and is movably connected to the spring; and the limit cylinder spacing barrel is arranged in the rotary knob and sleeved outside the ball arm.

(III) Beneficial Effects

The present invention provides a foldable and flexible vent for an air conditioner and has the following advantageous effects compared to the prior art.
1. The distance between the vent and the passenger and the wind direction and angle are pre-adjusted by the base, the hose and the air guide cylinder, and then rotates along the radial direction of the air guide cylinder by a plurality of air dampers and adjusts the air volume and the wind direction and angle of the air guide cylinder. The plurality of air dampers are distributed in a circular array in the air guide cylinder with the axis thereof as the center, and then adjusted by the synchronous angle of the rotating mechanism, so that the wind direction of the hose flowing into the air guide cylinder is uniformly discharged in a spiral manner, achieving the effect of simple, convenient and efficient uniform venting.
2. The rotating mechanism and the linkage assembly on the plurality of air dampers act synchronously and drive the plurality of air guide plates to rotate synchronously at equal angles. By means of the linkage assembly using the first baffle and the second baffle to cooperate with the rotating mechanism, the clockwise rotation or the counterclockwise rotation of the rotating mechanism can both accurately and synchronously adjust the wind direction angle and the wind volume of the plurality of air dampers. The center line of the guide groove formed between the first baffle and the second baffle is in the same plane and perpendicular to the rotation axis of the guide plate, so that the clockwise rotation or the counterclockwise rotation of the rotating mechanism is consistent with the acting force of the first baffle and the second baffle, avoiding the situation that the uniform venting of the vent is affected due to the serious local wear caused by the inconsistent force during the adjustment of the vent.
3. According to the rotary mechanism, a rotary disc, a rotary knob and a driving assembly cooperate with each other, so that the rotary mechanism facilitates manual synchronous equal-angle adjustment of a plurality of air guide plates to rotate at equal angles, and then the driving assembly uses a vertical plate and a plurality of screws to drive the first baffle and the second baffle to drive the air guide plates to rotate. Thus, the cylindrical surface on the screws is in line contact with both the first baffle and the second baffle, thereby further avoiding the situation of excessive resistance or serious wear during the adjustment of the vent and affecting uniform venting of the vent. Finally, the minimum distance between the first baffle and the second baffle and the air guide plate is not less than $D/\cos \beta$, so as to avoid the situation that the screw is separated from the first baffle and the second baffle during the adjustment of the air guide plate and affect the adjustment accuracy, and achieve the effects of simple and convenient high-precision synchronous equal-angle adjustment and uniform venting.

DETAILED DESCRIPTION OF THE EMBODIMENTS

The technical solutions in the embodiments of the invention will be described clearly and completely in conjunction with the accompanying drawings in the embodiments of the invention. Obviously, the described embodiments are only part of the embodiments of the invention, rather than all of the embodiments. Based on the embodiments in the invention, all other embodiments obtained by a person skilled in the art without involving any inventive effort are within the scope of protection of the invention.

Figure 1:
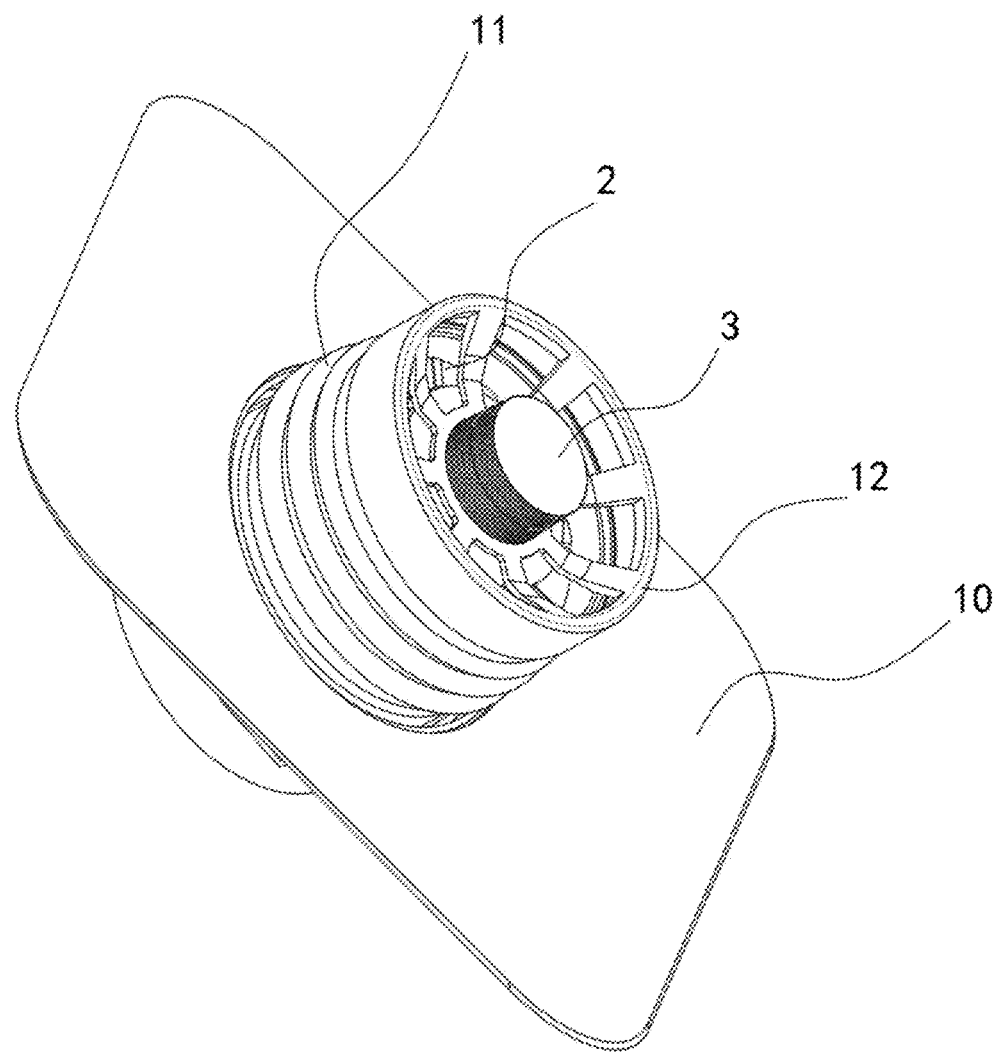
FIG. 1 is a perspective view showing a structure of a foldable and flexible vent for an air conditioner according to the present invention.

With reference to FIG. 1, a foldable and flexible vent for an air conditioner includes a base 10, a hose 11 and an air guide cylinder 12. The base 10 is movably mounted on an automobile, and one end of the base 10 communicates with the vent of the automobile air conditioner. One end of the hose 11 communicates with the vent of the base 10 via a fixed steel ring, and the other end thereof communicates with an air inlet of the air guide cylinder 12. The hose 11 is used for guiding the airflow of the base 10 flowing into the air guide cylinder 12. The vent further includes a air damper 2 and a rotating mechanism 3. The air damper 2 is rotatably mounted in the air guide cylinder 12 along the radial direction of the air guide cylinder 12, and the number of the air dampers 2 is not less than three. A plurality of air dampers 2 are distributed in a circular array on the air guide cylinder 12 with the axis of the air guide cylinder 12 as a center line, and are used for adjusting the wind direction and angle and the wind volume passing between the air dampers 2 and the air guide cylinder 12. The rotating mechanism 3 is mounted in the air guide cylinder 12 in the axial direction and is coaxial with the air guide cylinder 12, and slides against the air dampers 2 for synchronously adjusting the rotation of several air dampers 2 at an equal angle along the radial direction of the air guide cylinder 12. A plurality of air dampers 2 are arranged in the air guide cylinder 12, and the plurality of air dampers 2 are distributed in a circular array with the axis of the air guide cylinder 12 as the center line and may rotate along the radial direction of the air guide cylinder 12, so that when the air dampers 2 rotate to open, the wind direction of the hose 11 flowing into the air guide cylinder 12 is deflected under the action of the air dampers 2 and the wind direction angle and the wind volume between the air guide cylinder 12 and each of the air dampers 2 are adjusted. Then the plurality of air dampers 2 are adjusted at equal angles synchronously via the rotating mechanism 3, so that the wind direction and angle and the wind volume between the air guide cylinder 12 and each of the air dampers 2 are consistent and form a uniform spiral wind to achieve a simple, convenient and efficient uniform venting effect.

Figure 2:
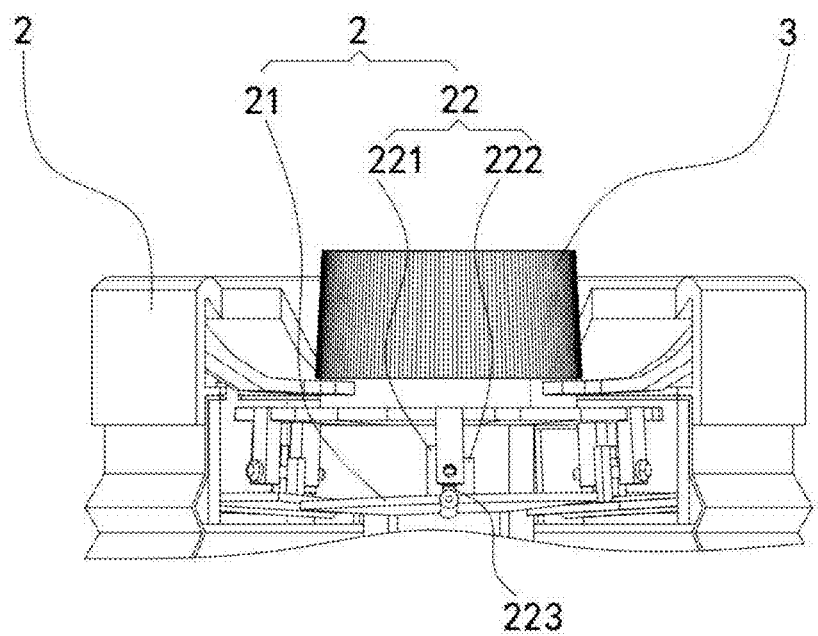
FIG. 2 is a front partial sectional view of a structure of a foldable and flexible vent for an air conditioner according to the present invention.

In order to further improve the venting uniformity of the vent for the air conditioner, specifically, the air damper 2 includes an air guide plate 21 and a linkage assembly 22. The air guide plate 21 is rotatably mounted in the air guide cylinder 12 along the radial direction of the air guide cylinder 12. A first mounting hole adapted to the air guide plate 21 is arranged in the air guide cylinder 12. A gap between the air guide plate 21 and the air guide cylinder 12 forms an air flow channel during the rotation of the air guide plate 21. The linkage assembly 22 is arranged on the air guide plate 21 and slidingly abuts against the rotating mechanism 3 for driving the air guide plate 21 to rotate in cooperation with the rotating mechanism 3, as shown in FIG. 2. The rotating mechanism 3 synchronously interacts with the linkage assemblies 22 on the plurality of air dampers 2 and drives the plurality of air guide plates 21 to rotate at an equal angle with the radial direction of the air guide cylinder 12 as an axis, so that the angle and the opening and closing gap between each air guide plate 21 and the air guide cylinder 12 are consistent, so as to avoid the situation that the wind direction and the wind volume between each air guide plate 21 and the air guide cylinder 12 are inconsistent to affect the venting uniformity of the air conditioner.

In order to further improve the venting uniformity of the vent for the air conditioner, specifically, the linkage assembly 22 includes a first baffle 221 and a second baffle 222. The first baffle 221 is fixedly mounted on a side of the air guide plate 21 away from the base 10 and slidingly abuts against the rotating mechanism 3. The second baffle 222 is spaced apart from the first baffle 221 and fixedly mounted on the air guide plate 21. A guide groove a which slidingly abuts against the rotating mechanism 3 is formed between the first baffle 221 and the second baffle 222. The guide groove a between the first baffle 221 and the second baffle 222 slidingly abuts against the rotating mechanism 3, so that the rotating mechanism 3 always abuts against the first baffle 221 and the second baffle 222 when rotating clockwise or counterclockwise and precisely limits the air guide plate 21, so as to avoid falling off from the rotating mechanism 3 during the rotation of the air guide plate 21 and affecting the venting uniformity between each air guide plate 21 and the air guide cylinder 12.

In order to further improve the venting uniformity of the air conditioner, specifically, the center line of the guide groove a is in the same plane and perpendicular to the rotation axis of the air guide plate 21, so that the rotating mechanism 3 rotates clockwise or counterclockwise at the same angle. The rotating mechanism 3 drives the air guide plate 21 to rotate clockwise or counterclockwise at the same deflection angle by the first baffle 221 and the second baffle 22. The acting force between the rotating mechanism 3 and the first baffle 221 and the second baffle 222 is consistent, avoiding that the first baffle 221, the second baffle 222 and the air guide plate 21 are not uniformly stressed to cause deformation or damage and affect the venting uniformity of the air conditioner.

Figure 3:
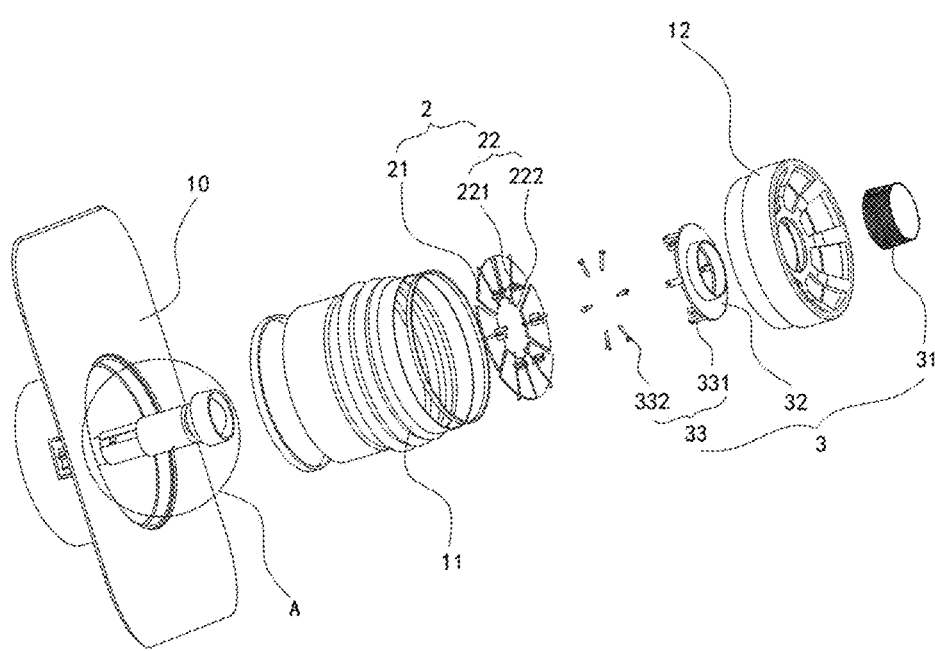
FIG. 3 is an exploded view of a structure of a foldable and flexible vent for an air conditioner according to the present invention.

In order to further improve the venting uniformity of the air conditioner, specifically, the rotating mechanism 3 includes a rotary disc 31, a rotary knob 32 and a driving assembly 33. The rotary disc 31 is rotatably mounted in the air guide cylinder 12 along the axial direction and is coaxial with the air guide cylinder 12. The rotary knob 32 is movably mounted on a side of the rotary disc 31 away from the base 10. An anti-skid groove is formed on an outer wall of the rotary knob 32. The driving assembly 33 is arranged on the rotary disc 31 and extends into the guide groove a. The driving assembly 33 drives the air guide plate 21 to rotate radially along the air guide cylinder 12 via the first baffle 221 and the second baffle 222. In the present embodiment, the rotary disc 31 and the rotary knob 32 are used to drive the driving assembly 33 to rotate, and a servo motor cooperating with a gear may also be used to drive the driving assembly 33 to rotate, as shown in FIG. 3. By rotating the rotary knob 32, the rotary knob 32 drives the driving assembly 33 via the rotary disc 31 to synchronously interact with the first baffle 221 and the second baffle 222 on the plurality of air guide plates 21 and adjusts the gap between the air guide plates 21 and the air guide cylinder 12 at equal angles, so as to achieve the effect of uniform venting.

In order to further improve the venting uniformity of the vent for the air conditioner, specifically, the driving assembly 33 includes a vertical plate 331 and screws 332. The vertical plate 331 is fixedly mounted on the rotary disc 31. The screws 332 are movably mounted on the vertical plate 331 along the radial direction of the air guide cylinder 12 and slidingly abuts both the first baffle 221 and the second baffle 222. The number of the screws 332 is equal to the number of the air guide plates 21, and the screws 332 are distributed in a circular array with the axis of the air guide cylinder 12 as a center line. The vertical plate 331 is used in cooperation with the screws 332 for the driving assembly 33, so that the cylindrical surface of the screws 332 is always in arc-shaped gradual line contact with the first baffle 221 and the second baffle 222 when the first baffle 221 and the second baffle 222 are relatively moved, thereby reducing the driving resistance of the driving assembly 33 and avoiding the situation that the wear between the driving assembly 33 and the first baffle 221 and the second baffle 222 seriously affects the venting uniformity of the vent for the air conditioner.

In order to further improve the venting uniformity of the air conditioner, specifically, the distance between the air guide plate 21 and the rotary disc 31 is less than a maximum distance between the edge portion of the air guide plate 21 and the rotation axis thereof. Namely, when the air guide plate 21 rotates to the maximum angle $\beta$, $\beta$ is less than ninety degrees, and a side of the air guide plate 21 away from the base 10 abuts against the rotary disc 31. When the plane where the air guide plate 21 is located is perpendicular to the axis of the air guide cylinder 12, the distance D between the screw 332 and the air guide plate 21 is minimum. The minimum distance between the first baffle 221 and the second baffle 222 and the air guide plate 21 is not less than D/cos β. The minimum distance between the first baffle 221 and the second baffle 222 and the air guide plate 21 is not less than D/cos β. That is, when the air guide plate 21 rotates clockwise or counterclockwise to the maximum angle β, both the first baffle 221 and the second baffle 222 abut against the screw 332, so as to avoid the detachment between the screw 332 and the first baffle 221 and the second baffle 222, resulting in the self-adaptive deflection of the air guide plate 21 and affecting the consistency of the angles between the multiple air guide plates 21 and the air guide cylinder 12, thereby improving the venting uniformity of the vent for the air conditioner.

Figure 4:
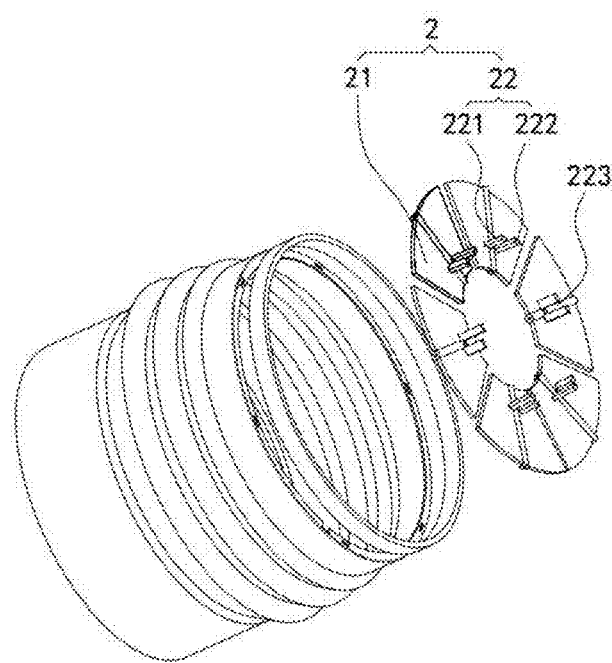
FIG. 4 is a partial perspective view showing another embodiment of a foldable and flexible vent for an air conditioner according to the present invention.

In the above-mentioned embodiments of the present technical solution, the first baffle 221 and the second baffle 222 are used by the linkage assembly 22 to cooperate with the vertical plate 331 and the screw 332 on the driving assembly 33 to synchronously drive the air guide plate 21 to rotate at equal angles or use a hinged seat p and a connecting rod q to cooperate with the vertical plate 331 and the screw 332 on the driving assembly 33 to synchronously drive the air guide plate 21 to rotate at equal angles, as shown in FIG. 4, provided that the air guide plate 21 is synchronously adjusted at equal angles to rotate in the radial direction of the air guide cylinder 12.

Figure 5:
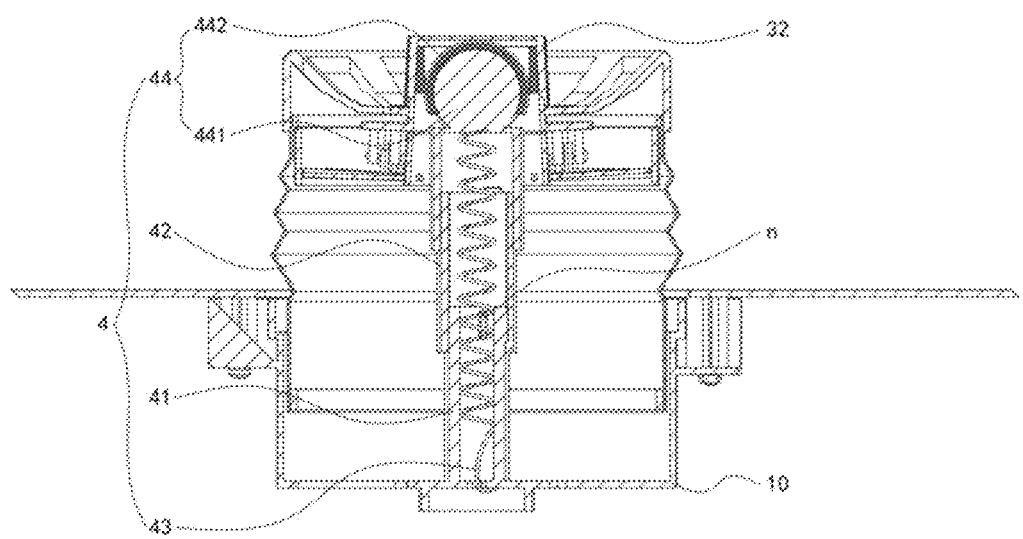
FIG. 5 is a front sectional view of a structure of a foldable and flexible vent for an air conditioner according to the present invention.

In order to further improve the venting uniformity of the vent for the air conditioner, specifically, a telescopic mechanism 4 is further included. One end of the telescopic mechanism 4 is fixedly connected to the base 10, and the other end is movably connected to the rotary knob 32 for adjusting the distance and angle between the rotary knob 32 and the base 10, as shown in FIG. 5. The distance and angle between the rotary knob 32 and the base 10 are adjusted and positioned by the telescopic mechanism 4. Since the rotary knob 32 is movably mounted on the rotary disc 31 and the rotary disc 31 is rotatably mounted in the air guide cylinder 12 along the axial direction, the distance and angle between the base 10 and the air guide cylinder 12 are limited so as to avoid the situation of the venting uniformity of the gap between the air guide plate 21 and the air guide cylinder 12 caused by the transitional distortion and deformation of the hose 11 during the telescopic adjustment of the base 10 and the air guide cylinder 12.

In order to further improve the venting uniformity of the vent for the air conditioner, specifically, the telescopic mechanism 4 includes a positioning cylinder 41, a first sleeve 42, a spring 43 and a rotating assembly 44. The positioning cylinder 41 is fixedly mounted on the base 10. The first sleeve 42 is sleeved on the outer wall of the positioning cylinder 41. The first sleeve 42 is provided with a through hole m. The positioning cylinder 41 is fixedly mounted with a clamping block n extending into the through hole m. The inner wall of the first sleeve 42 is provided with a positioning groove. The outer wall of the positioning cylinder 41 is provided with a positioning block extending into the positioning groove. One end of the spring 43 is movably connected to the positioning cylinder 41, and the other end is movably connected to the rotating assembly 44. A second mounting hole adapted to the spring 43 is provided inside the positioning cylinder 41. The rotating assembly 44 is arranged on a side of the first sleeve 42 away from the base 10 and is movably connected to the rotary knob 32. The distance between the air guide cylinder 12 and the base 10 is pulled telescopically and adjusted, and the angle between the positioning cylinder 41 and the first sleeve 42 is defined by cooperation and sliding of a positioning block on the positioning cylinder 41 and a positioning groove on the first sleeve 42. The adjusting distance between the rotating assembly 44, the rotary knob 32, the air guide cylinder 12 and the base 10 are defined by a clamping block n on the positioning cylinder 41 and the first sleeve 42 slidingly abutting. When the clamping block n on the positioning cylinder 41 is clamped with the through hole m on the first sleeve 42, the adjusting distance between the air guide cylinder 12 and the base 10 is the maximum. Thus, it is avoided that the positioning cylinder 41 and the first sleeve 42 fall off or rotate during the adjustment of the vent for the air conditioner, so that the hose 11 is distorted and deformed under the gravity of the air guide cylinder 12 itself, thereby affecting the venting uniformity of the gap between the air guide plate 21 and the air guide cylinder 12.

Figure 6:
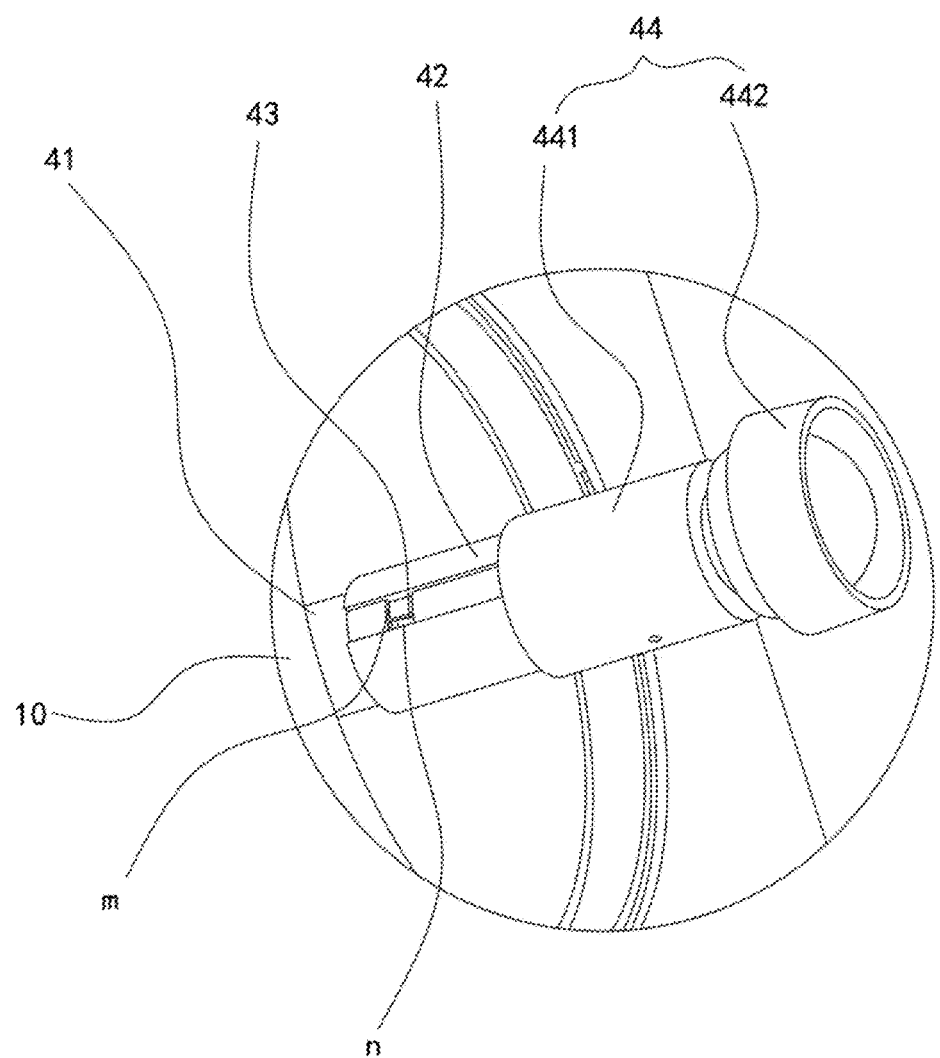
FIG. 6 is an enlarged view at A in FIG. 3.
Figure 7:
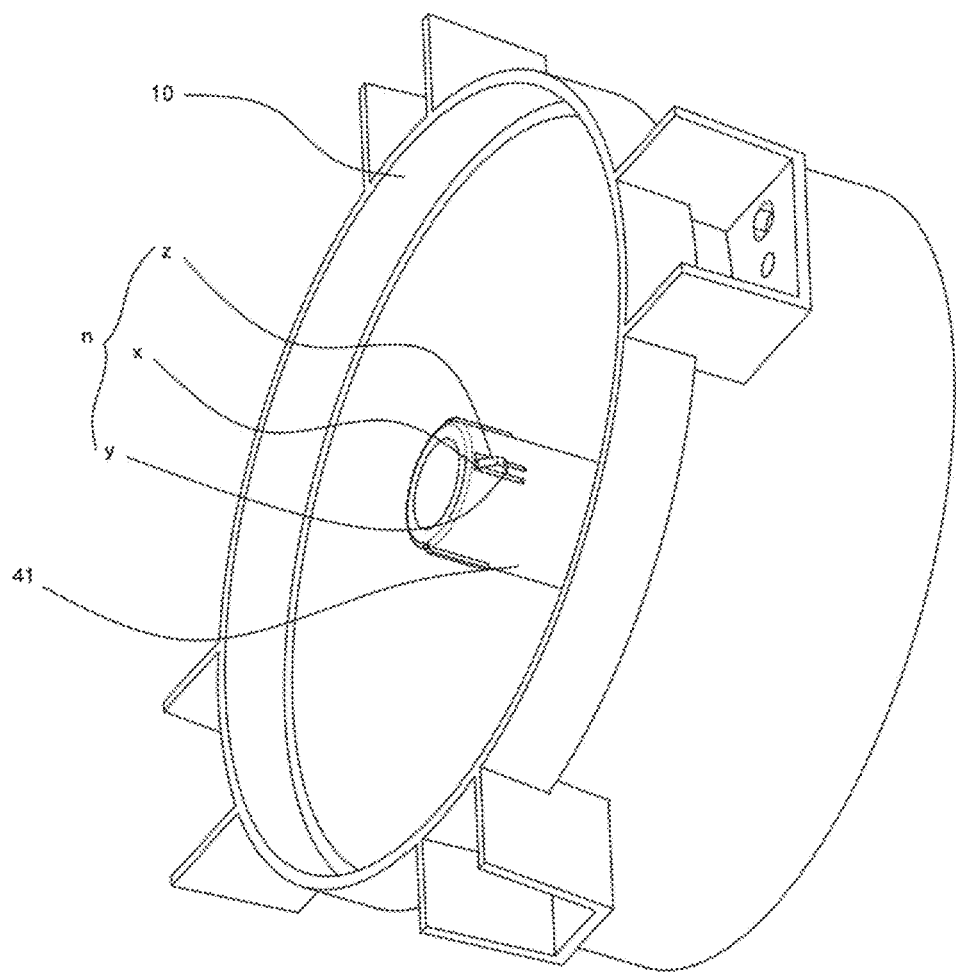
FIG. 7 is a stereogram of a local structure of a positioning cylinder and a base according to the present invention.

In order to further improve the venting uniformity of the vent for the air conditioner, specifically, the clamping block n includes an elastic portion x, an abutting surface y and a guide surface z. The elastic portion x is provided with an abutting surface y perpendicular to the axial direction of the positioning cylinder 41. The abutting surface y is used for limiting the axial direction of the first sleeve 42 and the positioning cylinder 41. An end of the elastic portion x away from the base 10 is provided with the guide surface z that is inclined transitional. The rotating assembly 44 includes a ball arm 441 and a limit cylinder 442. The ball arm 441 is sleeved on an end of the first sleeve 42 away from the base 10 and is movably connected to the spring 43. The ball arm 441 is provided with a third mounting hole adapted to the spring 43. The ball arm 441 is provided with a groove adapted to the first sleeve 42. The limit cylinder 442 is fixedly mounted on the inner side of the rotary knob 32 and sleeved on the outer wall of the ball arm 441, as shown in FIGS. 6 and 7. When the clamping block n is located inside the first sleeve 42, the elastic portion x of the clamping block n on the positioning cylinder 41 elastically abuts against the first sleeve 42 and defines the position of the positioning cylinder 41 and the first sleeve 42. When the clamping block n is clamped with the through hole m on the first sleeve 42, the elastic portion x of the clamping block n on the positioning cylinder 41 drives the abutting surface y to abut against the inner wall of the through hole m and defines the position of the positioning cylinder 41 and the first sleeve 42. When it is required to compress the positioning cylinder 41 and the first sleeve 42, the elastic portion x on the clamping block n drives the guide surface z to cooperate with the gradual bending of the first sleeve 42 to achieve rapid compression. Thus, the accurate extending-retracting and positioning between the air guide cylinder 12 and the base 10 are achieved, and then the angle of the air guide cylinder 12 is limited by the ball arm 441 on the rotating assembly 44 cooperating with the limit cylinder 442, so as to achieve the effect of simple and convenient high-precision multi-stage regulation and uniforming vent.

The working principle of this technical solution.

By rotating the rotary knob 32, the rotary knob 32 simultaneously drives the plurality of screws 332 to interact with the first baffle 221 and the second baffle 222 on the air guide plate 21 via the rotary disc 31 and the vertical plate 331, and synchronously adjusts the angle and the opening and closing degree between the plurality of air guide plates 21 and the air guide cylinder 12 at equal angles, so that the flow of the hose 11 into the interior of the air guide cylinder 12 is guided by the plurality of air guide plates 21 to achieve the effect of spiral uniform venting. The distance between the air guide cylinder 12 and the base 10 is adjusted by telescopic adjustment. The air guide cylinder 12 drives the first sleeve 42 and the positioning cylinder 41 to extend and retract via the rotary disc 31 and the rotary knob 32. At the same time, the clamping block n and the through hole m on the first sleeve 42 and the positioning cylinder 41 and the positioning groove and the positioning block respectively limit the axial adjustment distance and the radial angle of the ball arm 441 and support the air guide cylinder 12, so as to prevent the hose 11 from being distorted and deformed under the gravity of the air guide cylinder 12 itself, thus affecting the venting uniformity of the gap between the air guide plate 21 and the air guide cylinder 12. Finally, by rotating the air guide cylinder 12, the air guide cylinder 12 drives the limit cylinder 442 and the ball arm 441 to rotate relative to each other via the rotary disc 31 and the rotary knob 32, thereby performing multi-stage adjustment and limiting on the wind direction of the air guide cylinder 12.

It should be noted that relational terms such as first and second, and the like, may be used herein to distinguish one entity or action from another entity or action without necessarily requiring or implying any such actual relationship or order between such entities or actions. Furthermore, the terms "comprises", "comprising", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by the phrase "comprising a" does not, without more constraints, preclude the existence of additional identical elements in the process, method, article, or apparatus that includes the element.

While embodiments of the present invention have been shown and described, it will be understood by those skilled in the art that various changes, modifications, substitutions and alterations may be made herein without departing from the principles and spirit of the invention, the scope of which is defined by the appended claims and their equivalents.

What is claimed is:

1. A foldable and flexible vent for an air conditioner, comprising a base (10), a hose (11) and an air guide cylinder (12), wherein one end of the base (10) communicates with the air conditioner and the other end communicates with the hose (11); the air guide cylinder (12) is arranged at one end of the hose (11) away from the base (10), characterized in that the vent further comprises a plurality of air dampers (2) and a rotating mechanism (3), the rotating mechanism (3) comprises a rotary disc (31), a rotary knob (32) and a driving assembly (33);

the plurality of air dampers (2) are arranged in the air guide cylinder (12) and are rotatable in a radial direction of the air guide cylinder (12); the number of air dampers (2) is not less than three; the plurality of air dampers (2) are distributed in a circular array with the axis of the air guide cylinder (12) as a center line, and are used for adjusting a wind direction angle and a wind volume of the air guide cylinder (12);

the rotating mechanism (3) is arranged to rotate coaxially with the air guide cylinder (12) and slidably abut against the plurality of air dampers (2), and is used for synchronously and equiangularly adjusting the rotation of the plurality of air dampers (2).

2. The foldable and flexible vent for the air conditioner according to claim 1, characterized in that the plurality of air damper (2) comprises at least one air guide plate (21) and a linkage assembly (22);

the at least one air guide plate (21) is rotatably arranged in the air guide cylinder (12) along the air guide cylinder (12) in a radial direction and forms an air flow channel with the air guide cylinder (12);

a linkage assembly (22) is arranged on the at least one air guide plate (21) and slidably abuts against the rotating mechanism (3), and is used for driving the at least one air guide plate (21) to rotate in cooperation with the rotating mechanism (3).

3. The foldable and flexible vent for the air conditioner according to claim 2, characterized in that the linkage assembly (22) comprises a first baffle (221) and a second baffle (222);

the first baffle (221) is arranged on a side of the at least one air guide plate (21) away from the base (10) and slidably abuts against the rotating mechanism (3);

the second baffle (222) is spaced apart from the first baffle (221) and arranged on the at least one air guide plate (21); and a guide groove (a) slidingly abutting against the rotating mechanism (3) is formed between the first baffle (221) and the second baffle (222).

4. The foldable and flexible vent for the air conditioner according to claim 3, characterized in that the center line of the guide groove (a) is in a same plane as and perpendicular to a rotation axis of the at least one air guide plate (21).

5. The foldable and flexible vent for the air conditioner according to claim 3, characterized in that;

the rotary disc (31) is arranged to rotate coaxially with the air guide cylinder (12);

the rotary knob (32) is arranged on a side of the rotary disc (31) away from the base (10);

The driving assembly (33) is arranged on the rotary disc (31) and extends into the guide groove (a) for driving the first baffle (221) and the second baffle (222) to rotate the at least one air guide plate (21).

6. The foldable and flexible vent for the air conditioner according to claim 5, characterized in that the driving assembly (33) comprises a vertical plate (331) and screws (332);

the vertical plate (331) is arranged on the rotary disc (31);

the screws (332) are arranged on the vertical plate (331) in the radial direction of the air guide cylinder (12) and slide against both the first baffle (221) and the second baffle (222); the number of the screws (332) is equal to the number of the at least one air guide plate (21); and the screws (332) are distributed in a circular row with the axis of the air guide cylinder (12) as the center line.

7. The foldable and flexible vent for the air conditioner according to claim 6, characterized in that when the at least one air guide plate (21) rotates to a maximum angle β, the at least one air guide plate (21) abuts against the rotary disc (31); when the plane of the air guide plate (21) is perpendicular to the axis of the air guide cylinder (12), a minimum distance between the screw (332) and the axis of rotation of the at least one air guide plate (21) is D; and the minimum distance between the first baffle (221) and the second baffle (222) and the at least one air guide plate (21) is not less than D/cos β.

8. The foldable and flexible vent for the air conditioner according to claim 5, characterized by further comprising a telescopic mechanism (4), wherein one end of the telescopic mechanism (4) is fixedly connected to the base (10), and the other end thereof is movably connected to the rotary knob (32) for adjusting a distance and an angle between the rotary knob (32) and the base (10).

9. The foldable and flexible vent for the air conditioner according to claim 8, characterized in that the telescopic mechanism (4) comprises a positioning cylinder (41), a first sleeve (42), a spring (43) and a rotating assembly (44), the rotating assembly (44) comprises a ball arm (441) and a limit cylinder (442);

the positioning cylinder (41) is arranged on the base (10);

the first sleeve (42) is sleeved with and covers a portion of an outer wall of the positioning cylinder (41); the first sleeve (42) is provided with a through hole (m); the positioning cylinder (41) is provided with a clamping block (n) extending into the through hole (m); the inner wall of the first sleeve (42) is provided with a positioning groove; the positioning cylinder (41) is provided with a positioning block extending into the positioning groove;

one end of the spring (43) is arranged on the positioning cylinder (41), and the other end is arranged on the rotating assembly (44); and the rotating assembly (44) is arranged on the first sleeve (42) and is movably connected to the rotary knob (32).

10. The foldable and flexible vent for the air conditioner according to claim 9, characterized in that the clamping block (n) comprises an elastic portion (x), an abutting surface (y) and a guide surface (z);

the elastic portion (x) is arranged on the positioning cylinder (41);

the abutting surface (y) perpendicular to the axis of the positioning cylinder (41) is arranged on the elastic portion (x), and the abutting surface (y) is used for axially limiting the first sleeve (42) and the positioning cylinder (41);

one end of the elastic portion (x) away from the base (10) is provided with the guide surface (z);

the ball arm (441) is arranged at one end of the first sleeve (42) away from the base (10) and is movably connected to the spring (43); and the limit cylinder (442) is arranged in the rotary knob (32) and sleeved outside the ball arm (441).

* * * * *